(12) United States Patent
Wang et al.

(10) Patent No.: US 7,128,545 B2
(45) Date of Patent: Oct. 31, 2006

(54) TIRE CURING BLADDER

(75) Inventors: Yang Wang, Twinsburg, OH (US); Ikechukwu Joel Okoye, Akron, OH (US); Alfonso Quijano, Uniontown, OH (US); Susan Lynn Ashton, Cuyahoga Falls, OH (US); Ching-Chih Lee, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/152,295

(22) Filed: Jun. 14, 2005

(65) Prior Publication Data

US 2006/0040007 A1   Feb. 23, 2006

Related U.S. Application Data

(60) Provisional application No. 60/603,700, filed on Aug. 23, 2004.

(51) Int. Cl.
    *B29D 30/06*  (2006.01)
(52) U.S. Cl. .......................................... 425/52; 425/43
(58) Field of Classification Search ................. 425/43, 425/52; 264/315
    See application file for complete search history.

(56) References Cited

U.S. PATENT DOCUMENTS

| | | | |
|---|---|---|---|
| 3,574,893 A * | 4/1971 | Balle et al. .................... | 425/43 |
| 3,647,598 A | 3/1972 | Gazuit ......................... | 156/415 |
| 3,837,770 A * | 9/1974 | Gazuit ......................... | 425/52 |
| 3,932,255 A | 1/1976 | Saracsan ....................... | 156/401 |
| 3,963,394 A | 6/1976 | Shichman et al. ............. | 425/51 |
| 3,990,930 A | 11/1976 | Schmit ......................... | 156/123 |
| 4,087,307 A | 5/1978 | Head et al. ................... | 156/401 |
| 4,197,064 A * | 4/1980 | MacMillan ..................... | 425/52 |
| 5,403,174 A * | 4/1995 | Ushikubo et al. .............. | 425/43 |
| 5,580,513 A | 12/1996 | Patitsas et al. .............. | 264/501 |
| 6,129,812 A | 10/2000 | Sanders et al. .............. | 156/401 |
| 6,824,724 B1 | 11/2004 | Mori et al. ................... | 264/315 |

FOREIGN PATENT DOCUMENTS

| | | |
|---|---|---|
| DE | 1 778 615 | 3/1972 |
| EP | 1 308 257 A2 | 5/2003 |
| JP | 04 275108 A | 9/1992 |

* cited by examiner

*Primary Examiner*—James P. Mackey
(74) *Attorney, Agent, or Firm*—Nancy T. Krawczyk

(57) ABSTRACT

An expandable, toroidal shaped bladder for use in a tire curing press has a pair of opposing annular beads and an expansion portion location between the pair of annular beads. The expansion portion of the bladder has a central portion, shoulder portions, and sidewall portions. When the bladder is in a mounted but uninflated mode, the shoulder portions of the bladder have a radius of curvature R1 significantly less than a radius of curvature Rc of the central portion. The shoulder portions have a bubble or square-like configuration.

8 Claims, 3 Drawing Sheets

TIRE CURING BLADDER

This application claims the benefit of U.S. provisional application No. 60/603,700, filed on Aug. 23, 2004.

FIELD OF THE INVENTION

The present invention is directed towards a tire curing bladder. More specifically, the present invention is directed towards a curing bladder used in the tire curing press, wherein the bladder profile is optimized for improved life and curing.

BACKGROUND OF THE INVENTION

Conventionally, pneumatic rubber vehicle tires are produced by molding and curing a green (uncured) partially shaped tire in a molding press. The green tire is pressed outwardly against a mold surface by means of an inner fluid-expandable bladder. By this method, the green tire is shaped against the outer mold surface that defines the tire tread pattern and configuration of the sidewalls. By application of heat and pressure, the tire is molded and cured at elevated temperatures.

In general practice, the expansion of the bladder is accomplished by application of internal pressure to the inner bladder cavity which is provided by a fluid such as a gas, hot water and/or steam which also may participate in the transfer of heat for the curing or vulcanization of the tire. The tire after molding and curing is allowed to cool somewhat in the mold, sometimes aided by adding cold or cooler water supplied to the bladder. Then the mold is opened, the bladder is collapsed, including release of its internal fluid pressure, and the tire is removed from the tire mold. Such use of tire curing bladders is well known to those having skill in the art.

A cross sectional view of conventional tire curing bladder 100 is illustrated in FIG. 6; the bladder 100 has a toroidal shape, open at the inner side. The bladder has opposing bead regions 102 and an expansion area 104 between the bead regions 102. The bead regions are provided with means to secure the curing bladder to the press mechanism, enabling the bladder to expand outwards and into a green tire. During expansion of the bladder 100 into a tire cavity 106 during molding, the shoulder portions of the bladder 100 do not consistently make contact with the tire interior, leaving a gap 108 and trapped air between the tire bladder and the tire cavity, see FIG. 7. While the tire is fully cured, the gap may a cured defect in the tires.

SUMMARY OF THE INVENTION

The present invention is directed at a tire bladder wherein the profile of the tire bladder shoulder eliminates potential trapped air between the tire bladder and tire interior cavity during molding of the tire. The goal of the invention is to move the bladder shoulder profile further out than a conventional shaped bladder profile in order for the bladder to more rapidly contact the tire shoulder interior during curing, reducing the occurrence of any gap and trapped air between the bladder and the tire cavity and to minimize rubber flow of the tire during the curing process.

Disclosed is an expandable bladder for shaping a pneumatic tire to be mounted inside a tire curing press. The expandable bladder has a toroidal configuration and comprises a pair of opposing annular beads and an expansion portion located between the pair of annular beads. The expansion portion of the bladder has a central portion, shoulder portions, and sidewall portions. When the bladder is in a mounted but uninflated mode, the shoulder portions of the bladder have a radius of curvature $R1$ or $R4$ significantly less than a radius of curvature $Rc$ of the central portion. The shoulder portion has either at least one bubble portion or an almost squared off profile.

In one disclosed aspect of the invention, the radius of curvature $R1$ of the bubble portion has a value of not more than 20% of the bladder height $H$. The numerical value of the radius of curvature $R1$ of the bubble is dependent upon the bladder size.

In another disclosed aspect of the invention, the bubble portion of the bladder is smoothly connected to the central portion.

In another aspect of the invention, on each side of the bubble portion in each bladder shoulder portion is a small curved portion. Each small curved portion has a radius of curvature $R2$, $R3$ located outside of the bladder. In one variation of this profile, the radius of curvature $R2$, $R3$ of each small curved portion on each side of the bubble portion has a value greater than the radius of curvature $R1$ of the bubble portion. In another variation of this profile, the curved portion of the axially inner side of the bubble portion has a radius of curvature $R2$ greater than the radius of curvature on the axially outer side of the bubble portion.

Definitions

The following definitions are controlling for the disclosed invention.

"Axial" and "axially" are used herein to refer to lines or directions that are parallel to the central fixed internal line of the toroidal shape.

"Radial" and "radially" are used to mean directions perpendicular and toward or away from the central fixed internal line of the toroidal shape.

"Toroidal" means having a ring-like shape characterized by a circular configuration about a fixed line internal to the ring-like shape. For the curing bladder, the fixed line is parallel to the mounting post upon which the curing bladder is secured.

BRIEF DESCRIPTION OF THE DRAWINGS

The invention will be described by way of example and with reference to the accompanying drawings in which.

DETAILED DESCRIPTION OF THE INVENTION

Figure 1:
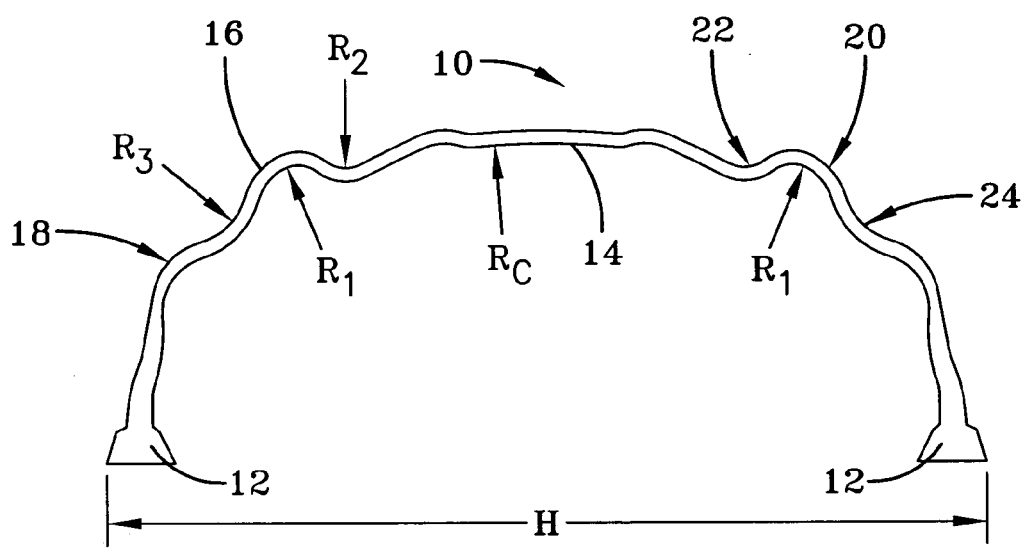
FIGS. 1–3 illustrate bladders in accordance with the present invention.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employ basically the same components with variations in location or quantity thereby giving rise to the alternative constructions in which the inventive concept can be practiced.

Figure 6:
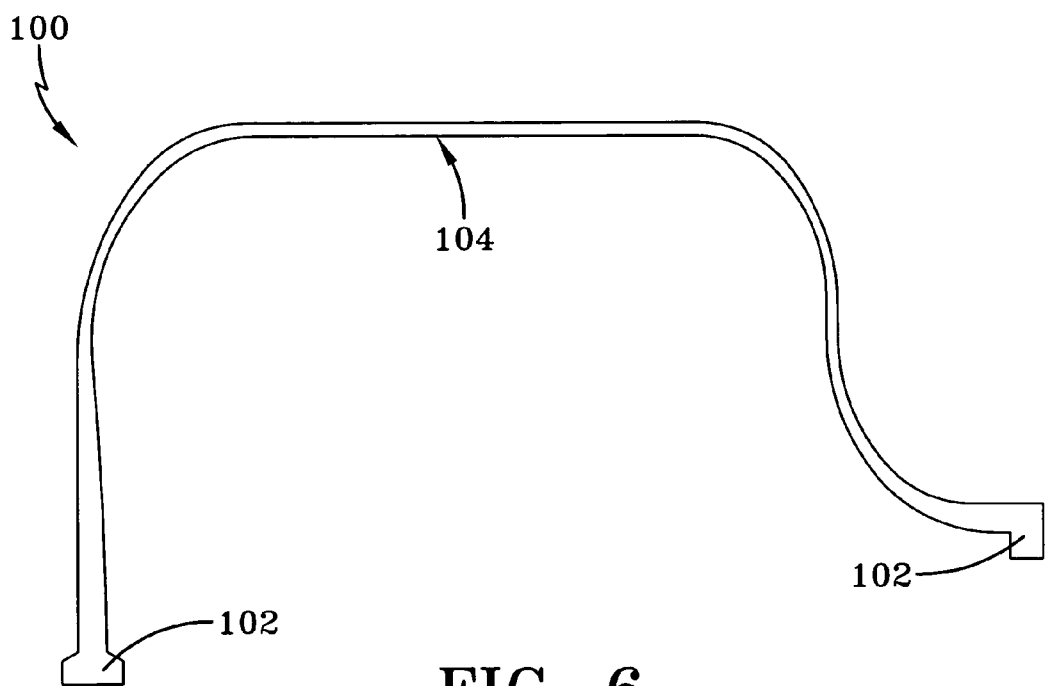
FIG. 6 is a prior art tire curing bladder.
Figure 7:
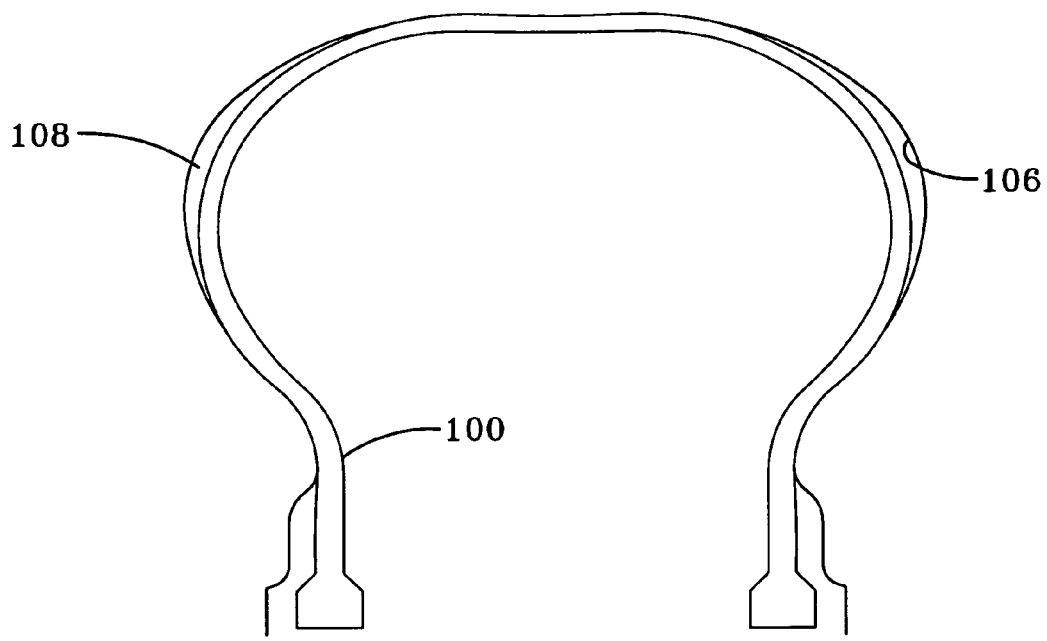
FIG. 7 is a prior art tire curing bladder after expansion into a tire cavity.

FIG. 1 illustrates a bladder 10 formed in accordance with the present invention. The illustrated profile is that of the bladder 10 as formed, not necessarily of the bladder 10 as mounted in a tire curing mold. While this bladder has a symmetrical profile in comparison to the asymmetrical profile of the prior art bladder of FIG. 6, the inventive changes to the bladder to be described herein are applicable to both types of bladder configurations. The bladder 10 has a pair of annular retaining beads 12 for securing the bladder 10 to the curing press (not illustrated). Between the retaining beads 12 is the expansion portion of the bladder 10. The expansion portion of the bladder 10 has a central portion 14, shoulder portions 16, and sidewall portions 18. These portions 14, 16, 18 are defined by the following points of reference and dimensions.

The bladder 10 has a profile wherein, instead of being defined by smoothly continuous radii wherein the center of curvature is located inward of the bladder profile as with the conventional bladder profile, each shoulder area 16 of the bladder 10 is defined by a bubble portion 20 having a radius of curvature R1 significantly less than the radius of curvature Rc of the central portion 14. Given that the central portion 14 of the bladder 10, when in an unexpanded position may have a flat profile, i.e. a radius of curvature Rc of infinity, the radius of curvature R1 of the bubble portion 20 is best defined as a portion of the bladder height H. The bladder height H is the distance between the outer edges of the retaining beads 12. The radius of curvature R1 of the bubble portion 20 has a value of not more than 20% of the bladder height H.

The bubble portion 20 may be smoothly connected to the central portion 14, or on at least one side of the bubble portion 20 there may be small curved portions 22, 24. In the illustrated bladder 10, there are small curved portions 22, 24 on each side of the bubble portion 20. Each curved portion 22, 24 has a radius of curvature R2, R3 located outside of the bladder profile. When the bladder 10 is provided with the two small curved portions, the radii of curvature R1, R2, and R3 are preferably smoothly continuous with one another. The radii of curvature R2, R3 of the two small curved portions 22, 24 have values equal or greater than the bubble portion 20 radius of curvature R1. The radii of curvature R2, R3 of the two small curved portions 22, 24 may or may not be substantially similar; if the radii have different values, preferably, the axially inner curved portion 22, i.e. closest to the central portion 14, has the larger radius of curvature forming a flatter or wider curve than the other curved portion 24 leading into the sidewall portions 18 of the bladder 10.

Figure 2:
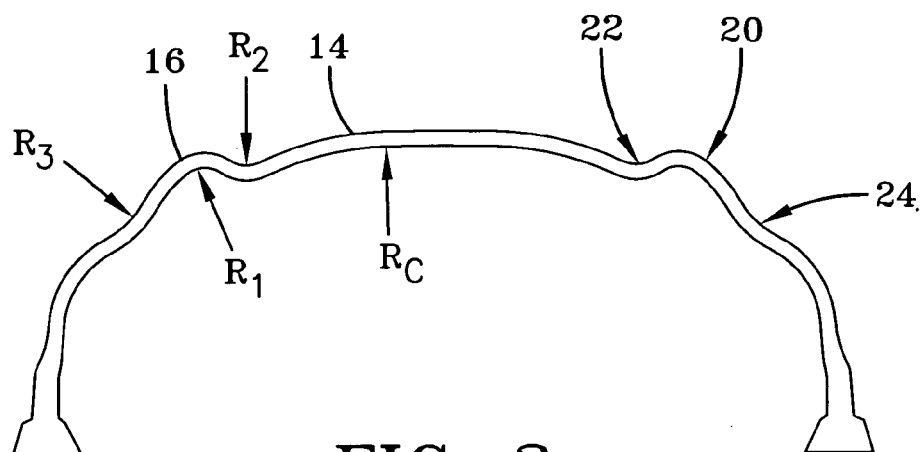
Figure 3:
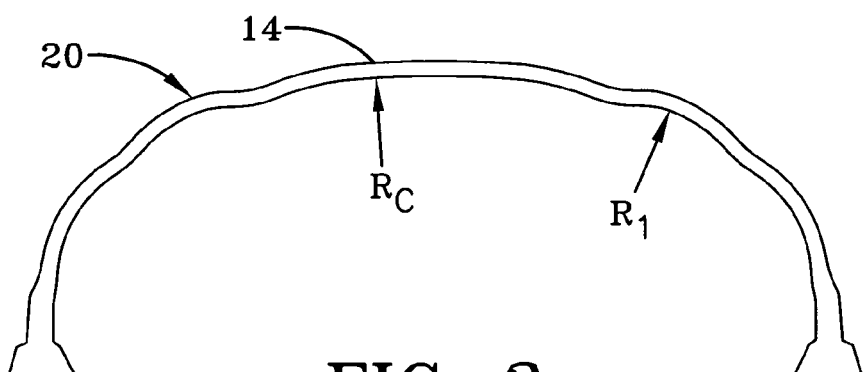

The values of the radii R1, R2, R3 are dependent upon the bladder size and upon the optimization of the bladder required to create contact between the bladder and the shoulder interior of the tire cavity. As seen in FIGS. 2 and 3, the bubble portion 20 may be less pronounced that that of the bladder of FIG. 1. In the bladder of FIG. 3, the bubble portion 20 is smoothly continuous with the central portion 14.

Figure 4:
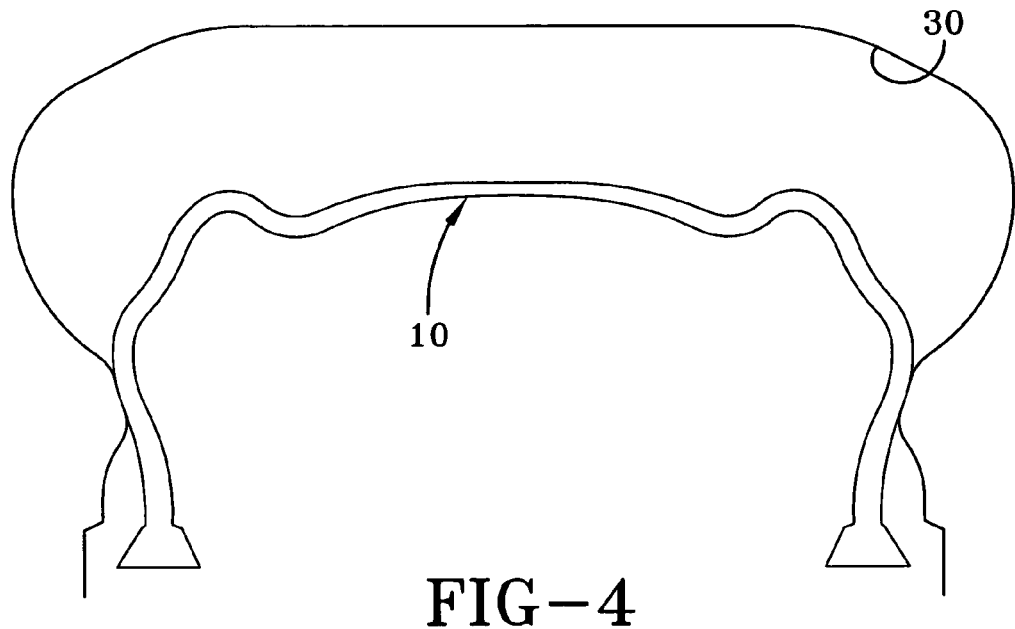
FIG. 4 illustrates the bladder as it expands into a tire cavity during molding.

As the profiled curing bladder 10 expands into the tire interior 30 during curing, see FIG. 4, the bubble portion 20 provides additional bladder material for contact with the interior of the tire shoulders, eliminating the possibility of any gaps between the tire interior 30 and the cure bladder 10.

Figure 5:
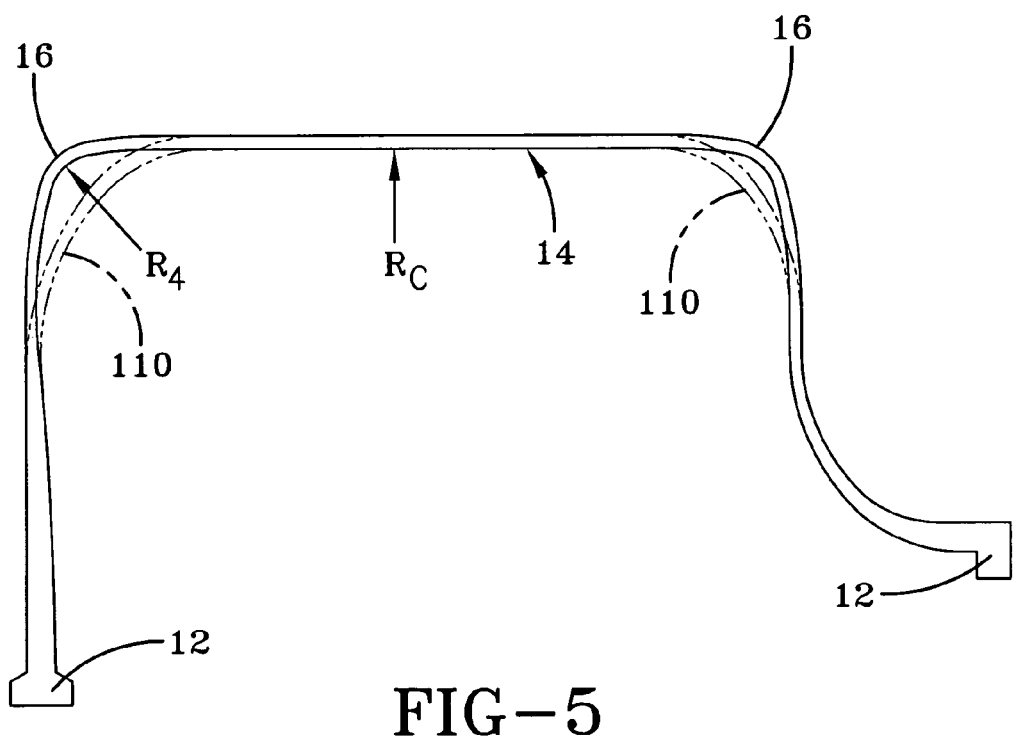
FIG. 5 illustrates another bladder in accordance with the present invention.

FIG. 5 illustrates another embodiment of the bladder profile wherein the profile of the shoulder portion 16 has been modified to "push out" the shoulder portion in comparison to a conventional bladder profile 110. Instead of providing a bubble portion 20 to push out the bladder shoulder portion 16, the shoulder portion 16 has an almost squared off configuration. The shoulder portion has a radius of curvature R4 significantly less than the radius of curvature Rc of the central portion 14.

The tire bladders of the present invention are formed from conventional expandable and durable materials, preferably rubber. The bladders may be reinforced with plies of parallel cord materials or woven fabrics. These features of a curing bladder are well known and conventional in the art of bladder forming.

The use of the improved bladder configuration may result in improved uniformity of the tires being produced, reduced trapped air defects, and reduced bladder wear thereby reducing overall manufacturing costs and reducing equipment down time normally required to change out the tire curing bladder.

What is claimed is:

1. An expandable bladder for shaping a pneumatic tire to be mounted inside a tire curing machine, the expandable bladder having a toroidal configuration and comprising
    a pair of opposing annular beads and an expansion portion located between the pair of annular beads, the expansion portion comprising a central portion, shoulder portions, and sidewall portions,
    wherein, when the bladder is in a mounted but uninflated mode, the bladder is characterized by the shoulder portions of the bladder having a first radius of curvature R1 significantly less than a radius of curvature Rc of the central portion and a second radius of curvature R2 located outside of the bladder, the second radius of curvature being located between the first radius of curvature R1 and the central portion radius of curvature Rc.

2. The bladder of claim 1 wherein the first radius of curvature R1 in the shoulder portions create a bubble portion.

3. The bladder of claim 2 wherein the radius of curvature R1 of the bubble portion has a value of not more than 20% of a height (H) of the bladder.

4. The bladder of claim 2 wherein the bubble portion is smoothly connected to the central portion.

5. The bladder of claim 2 wherein, on each side of the bubble portion in each bladder shoulder portion is a small curved portion, each small curved portion having a radius of curvature R2, R3 located outside of the bladder.

6. The bladder of claim 5 wherein the radius of curvature R2, R3 of each small curved portion on each side of the bubble portion has a value equal or greater than the radius of curvature R1 of the bubble portion.

7. The bladder of claim 5 wherein the curved portion of the axially inner side of the bubble portion has a radius of curvature R2 greater than the radius of curvature on the axially outer side of the bubble portion.

8. The bladder of claim 1 wherein the second radius of curvature R2 has a value equal or greater than the first radius of curvature R1.

* * * * *